(12) United States Patent
Halperin et al.

(10) Patent No.: US 12,330,864 B2
(45) Date of Patent: Jun. 17, 2025

(54) MONITORING ARRANGEMENT, AND A METHOD FOR INSTALLING SUCH A MONITORING ARRANGEMENT

(71) Applicant: MUNTERS ISRAEL LTD., Petah Tikva (IL)

(72) Inventors: Ben-Zion Halperin, Ramat-Gan (IL); Gennady Medvedev, Petah Tikva (IL)

(73) Assignee: Munters Israel Ltd., Petah Tikva (IL)

( * ) Notice: Subject to any disclaimer, the term of this patent is extended or adjusted under 35 U.S.C. 154(b) by 586 days.

(21) Appl. No.: 17/690,361

(22) Filed: Mar. 9, 2022

(65) Prior Publication Data

US 2023/0286738 A1  Sep. 14, 2023

(51) Int. Cl.
| | | |
|---|---|---|
| B65D 90/48 | (2006.01) | |
| A01F 25/16 | (2006.01) | |
| G01F 23/20 | (2006.01) | |
| G01G 19/52 | (2006.01) | |
| G01G 21/28 | (2006.01) | |

(52) U.S. Cl.
CPC ............ B65D 90/48 (2013.01); G01F 23/20 (2013.01); G01G 19/52 (2013.01); G01G 21/28 (2013.01); *A01F 25/163* (2013.01)

(58) Field of Classification Search
CPC ......... B65D 90/48; G01F 23/20; G01F 19/52; G01F 21/28; G01F 22/00; G01F 25/163; G01G 17/04; G01G 13/24
USPC ...................................................... 177/132
See application file for complete search history.

(56) References Cited

U.S. PATENT DOCUMENTS

| | | | | |
|---|---|---|---|---|
| 4,815,547 A | * | 3/1989 | Dillon | ..................... G01G 3/18 |
| | | | | 73/1.13 |
| 9,196,755 B2 | * | 11/2015 | Wildes | .................. F24S 25/636 |
| 9,316,756 B2 | * | 4/2016 | Smith | ................. E21B 41/0007 |
| 9,612,150 B2 | * | 4/2017 | Perrea | ................. G01G 23/005 |
| 11,892,336 B2 | * | 2/2024 | Beckett | ................ G01F 23/226 |
| 2020/0323169 A1 | | 10/2020 | Hogan et al. | |

FOREIGN PATENT DOCUMENTS

| | | |
|---|---|---|
| KR | 10-2131135 B1 | 7/2020 |
| WO | 2020/024067 A1 | 2/2020 |

OTHER PUBLICATIONS

International Search Report and Written Opinion dated May 23, 2023, in International Application No. PCT/IL2023/050237.

\* cited by examiner

*Primary Examiner* — Jacques M Saint Surin
(74) *Attorney, Agent, or Firm* — Venable LLP

(57) ABSTRACT

The invention relates to a monitoring arrangement (1) for a reservoir (2) with a plurality of support members (21), the monitoring arrangement (1) comprising: at least one load cell module (3) with a base plate (31) for attachment to a support surface (100) and an elongated measuring device (37) attached to the base plate (31); and at least one adapter unit (4) configured to be attached to a support member (21) of the reservoir (2) and rest on the measuring device (37); wherein the base plate (31) of the at least one load cell module (3) comprises a recess (32) allowing the base plate (31) to at least partly surround the support member (21) circumferentially when installed, and the measuring device (37) is arranged on the base plate (31), such that it at least partly extends over the recess (32).

15 Claims, 7 Drawing Sheets

US 12,330,864 B2

MONITORING ARRANGEMENT, AND A METHOD FOR INSTALLING SUCH A MONITORING ARRANGEMENT

TECHNICAL FIELD

The present invention relates to a monitoring arrangement for a reservoir and a reservoir comprising such a monitoring arrangement according to the appended claims. Furthermore, the invention relates to a method for installing such a monitoring arrangement according to the appended claims.

BACKGROUND AND PRIOR ART

Large elevated reservoirs, such as silos or feed bins, typically require monitoring to ensure proper function and adequate access to the content of the reservoir. By monitoring the weight of a reservoir, an alert can be provided to the user when the weight indicates that it is time to refill the reservoir. Furthermore, monitoring the weight may serve to avoid uncertainties in the availability of animal feed in a silo, thereby optimizing planning of feed ordering as well as refilling of the silo. Electronic devices of various kinds have been used for monitoring the weight of such reservoirs. Such electronic devices may be equipped with load cells placed underneath the reservoir, which serve to monitor the level of content in the reservoir by measuring the weight of the reservoir.

A disadvantage of known monitoring systems for reservoirs is that measuring equipment, such as load cells, are difficult to retrofit to the reservoir. Typically, such retrofitting operations require heavy machinery, such as cranes, as well as manpower, to lift the reservoir. Retrofitting reservoirs is thus often a very complicated and expensive project. In addition, stress due to the heavy load and moments exerted by the reservoir affect the monitoring systems and shorten the life span of their components, which increases the need for replacements and repairs.

Other solutions do not require heavy machinery to lift the reservoir. One example is presented in document US 2020/0323169 disclosing a system comprising a load cell, a support plate, a threaded bolt, an inner leg mount and an outer bracket mounted on the load cell. However, this system comprises multiple components with complex connections, which makes it bulky, less robust and complicates installation.

Document WO 2020/024067 discloses a compression load cell and a load cell base support for holding the load cell on the ground. The load cell base and the load cell are both positioned inside the support element, which makes it compact but also complicates installation.

Thus, there is a need for a monitoring arrangement that is uncomplicated to retrofit to reservoirs currently in place. In addition, there is a need for a reservoir monitoring arrangement that is compact, durable and reliable when subjected to heavy loads and stress.

SUMMARY OF THE INVENTION

Despite known solutions in the field, it would be desirable to develop a monitoring arrangement, which overcomes or alleviates at least some of the drawbacks of the prior art.

An object of the invention is thus to achieve a monitoring arrangement, which provides reliable monitoring information, even when subjected to heavy loads and stresses.

Another object of the invention is to achieve a monitoring arrangement, which is uncomplicated and straightforward, to retrofit to reservoirs currently in place.

Yet another object of the invention is to achieve a monitoring arrangement, which facilitates installation and maintenance, while providing a compact, space-saving, arrangement.

Yet another object of the invention is to achieve a monitoring arrangement, which is durable, robust and cost-effective.

A further object of the invention is to achieve a reservoir and a method, which achieve a high reliability in monitoring while at the same time providing for straightforward installation and decreased needs for maintenance, as well as an optimized use of space.

These objects are achieved with the monitoring arrangement, reservoir and method according to the appended claims.

Hence, according to an aspect of the present invention, a monitoring arrangement for a reservoir with a plurality of support members is provided. The monitoring arrangement comprises at least one load cell module with a base plate for attachment to a support surface and an elongated measuring device attached to the base plate; and at least one adapter unit configured to be attached to a support member of the reservoir and rest on the measuring device; wherein the base plate of the at least one load cell module comprises a recess allowing the base plate to at least partly surround the support member circumferentially when installed, and the measuring device is arranged on the base plate, such that it at least partly extends over the recess. The monitoring arrangement may be used for monitoring the weight of the reservoir.

Using a monitoring arrangement for monitoring a reservoir, such as a silo or feed bin, provides a possibility to ensure proper function and adequate access to the content of the reservoir. In the case of a reservoir containing animal feed, for example, monitoring the reservoir enables the user of the monitoring device to ensure that there is always enough feed for the animals. Furthermore, the user may be given an alert when supply in the reservoir runs low, so that he/she can refill the reservoir and/or order new feed in time. Also, by means of a monitoring arrangement, such as disclosed herein, real-time monitoring of food conversion ratios is enabled. A food conversion ratio may provide an indication of how many units of animal meat is produced from each unit of animal feed, for example how many kilograms of chicken that are produced by one kilogram of chicken feed. Monitoring arrangements typically comprise electronic devices, such as load cells, which contribute to the functioning of a monitoring arrangement by registering an elastic deformation corresponding to the load from, or weight of, the reservoir. Based on the load/weight, the level of the content in the reservoir can be determined. A load cell is typically arranged underneath a support member of the reservoir and should be arranged in a stable manner since the load cell supports the weight of the support member, and thereby supports at least a part of the reservoir. The configuration of the monitoring arrangement and the load cell's position in relation to the support member of the reservoir thus affects the stability of the reservoir as a whole.

By means of the recess in the base plate of the at least one load cell module, which allows the base plate to at least partly surround the support member circumferentially, the monitoring arrangement according to the present disclosure provides a stable arrangement, which is compact and space saving. The base plate at least partly surrounding the support member circumferentially increases the stability of the base plate, and the recess in the base plate means that less material can be used and the base plate covers a smaller area. Also, the measuring device being arranged such that it at least partly extends over the recess allows the measuring device to be deformed under the load of the reservoir. The present shape of the base plate ensures resistance to tilting and also enables the measuring device to be positioned closer to the centre of gravity of the support member, without any losses in stability of the reservoir and the monitoring arrangement. Thus, by means of the recess in the base plate, the measuring device fulcrum point may be positioned closer to the centre of gravity of the support member, to which it is to be connected. This reduces the stress exerted on the measuring device, thereby rendering the measuring device more enduring with a longer lifetime. Furthermore, such a configuration increases safety by preventing the support member from bending and it is beneficial since the position of the measuring device alleviates the consequences of a potential component failure that may be caused by high mechanical stress being applied on the reservoir support member.

Furthermore, the monitoring arrangement comprising an elongated measuring device attached to the base plate and an adapter unit configured to be attached to a support member of the reservoir and rest on the measuring device, provides a robust solution that produces reliable monitoring information, and which is easier to retrofit to reservoirs currently in place.

The at least one adapter unit may be configured to be attached in a cavity of the support member, and the at least one load cell module may be configured to be arranged, such that the measuring device extends into the cavity. This way, the adapter unit is protected inside the cavity and a robust and space-efficient monitoring arrangement is achieved.

The monitoring arrangement may further comprise at least one load support element configured to be arranged between the measuring device of the at least one load cell module and the at least one adapter unit, wherein the at least one load support element comprises a curved surface. The at least one load support element may be arranged on the measuring device and the at least one load cell module may be configured to be arranged, such that the at least one adapter unit abuts the curved surface of the load support element when installed. By means of the curved surface, the load support element is configured to compensate for any angular displacement between the load cell module and the adapted unit.

The at least one load cell module may comprise a sensor device arranged in the measuring device for sensing a deformation of the measuring device, the sensor device being operatively connectable to a control unit.

The measuring device and the at least one adapter unit may be configured to be connected to each other by means of a fastener extending through the at least one adapter unit and the measuring device. For connection by means of the fastener, the at least one adapter unit may comprise a first through hole with a first diameter, and the measuring device may comprise a second through hole with a second diameter, wherein the first diameter is larger than the second diameter. In the event that the monitoring arrangement comprises a load support element, the measuring device and the adapter unit of the monitoring arrangement may be configured to be connected to each other by means of a fastener extending through the adapter unit, the load support element and the measuring device. When the load support element is arranged on the measuring device, the second through-hole with the second diameter may extend through the load support element and the measuring device. When the load support element is arranged on the adapter unit, the first through-hole with the first diameter may extend through the adapter unit and the load support element. The second through-hole in the measuring device is suitably threaded and the fastener may thus be rigidly connected to the measuring device by means of the threads. The first diameter of the first through-hole in the adapter unit may be larger than the diameter of the fastener.

By applying through-holes of different sizes in the adapter unit and the measuring device respectively, movement between the components is enabled when the measuring device is deformed. Such a configuration of the connection between the measuring device and the adapter unit thus provides a clearance fit between the components, which leads to a more enduring connection. This way, the connection does not risk breaking or tearing by being too rigid, when exposed to heavy loads from the weight of the reservoir and/or to vibrations caused by filling or emptying the reservoir, for example. The connection between the adapter unit and the measuring device, via the load support element, may also be referred to as a bolted joint connection that may act as a bearing-type joint, allowing movement between the adapter unit which is rigidly attached to the support member and the measuring device, which is rigidly attached to the base plate. This way, the monitoring arrangement according to the present disclosure does not only increase the technical lifetime of the components in the monitoring arrangement, but also provides a greater tolerance in installation.

The monitoring arrangement may further comprise at least one spring washer configured to be arranged around the fastener at the at least one adapter unit. The spring washer increases the durability of the connection between the adapter unit and the measuring device by providing vibration resistance while maintaining resistance to rotation of the fastener. Furthermore, arranging the spring washer around the fastener will allow for some vertical movement between the adapted unit and the measuring device without compromising the stability of the connection.

The monitoring arrangement may further comprise a control unit operably coupled to the at least one load cell module. More specifically, the control unit may be operably coupled to the sensor device of the at least one load cell module. When the monitoring arrangement comprises a plurality of load cell modules, the weight of the reservoir will be distributed on all load cell modules. The control unit will then be configured to receive electrical signals from all load cell modules and based on these signals determine a total weight of the reservoir.

The monitoring arrangement may further comprise a lifting arrangement configured for use during installation at a support member of the reservoir, wherein the lifting arrangement comprises a lifting adapter configured to be attached to the support member, and a lifter configured to interact with the lifting adapter to lift the support member above the support surface. By means of the lifting arrangement, advantageous assembly/installation conditions are achieved, facilitating retrofitting of reservoirs currently in use. With the lifting arrangement, installation can be performed by a single person. Thus, installation is facilitated, which is both resource efficient and cost efficient.

According to another aspect of the present invention, a reservoir having a plurality of support members is provided. The reservoir comprises a monitoring arrangement as disclosed herein, wherein the at least one adapter unit of the monitoring arrangement is attached on a support member of the reservoir and the at least one load cell module is arranged, such that the base plate at least partly surrounds the support member circumferentially and such that the at least one adapter unit rests on the measuring device.

It is to be understood that the monitoring arrangement as disclosed herein may comprise a plurality of load cell modules and adapter units, suitably one load cell module and one adapter unit for each support member of the reservoir to be monitored.

The support member of the reservoir may be shaped such that it forms a cavity, into which the adapter unit may be inserted and attached. The cavity may also be referred to as a chamber, space, or opening. By way of example, the support member may have an essentially U-shaped, Ω-shaped or C-shaped profile, or cross-section.

According to yet another aspect of the present invention, a method for installing a monitoring arrangement as disclosed herein at a reservoir with a plurality of support members is provided. The method comprises attaching the at least one adapter unit on a support member; lifting the support member above the support surface; positioning the at least one load cell module, such that the base plate at least partly surrounds the support member circumferentially; and positioning the support member, such that the at least one adapter unit rests on the measuring device of the at least one load cell module. It is to be understood that features and advantages mentioned in relation to the monitoring arrangement as disclosed herein is also applicable on the method. The method may be a retrofit method, and the monitoring arrangement may thus be installed at a reservoir, which is already in use. Alternatively, the monitoring arrangement is installed at the same time as the reservoir.

The step of lifting the support member may comprise attaching a lifting adapter on the support member; and lifting the support member above the support surface by means of a lifter interacting with the lifting adapter.

The step of positioning the at least one load cell module may comprise positioning the at least one load cell module such that the measuring device extends into a cavity formed by the support member profile shape.

Attaching the lifting adapter may comprise attaching the lifting adapter on an opposite side of the support member compared to the adapter unit, by using a fastener for attaching the adapter unit.

The load cell module may be a strain gauge module, for example a bending beam load cell module. The measuring device of the load cell module may thus be referred to as a bending beam load cell. Such load cells are subject to elastic deformation under stress, thereby indicating the weight of the measured entity. The features and functioning of a load cell is considered to be common knowledge and explicit details about the measuring device will therefore not be discussed herein. With the monitoring arrangement as disclosed herein, the adapter unit will rest on the measuring device of the load cell module and the weight/load of the support member/reservoir is thereby applied on the measuring device. The measuring device will thereby elastically deform, i.e. bend, under the weight of the reservoir. The deformation may thus correspond to a weight of the reservoir, which could give an indication of the quantity of material in the reservoir. The load cell module is thus configured to detect a deformation of the measuring device.

Elevated reservoirs with a plurality of support members may be positioned on a concrete slab, platform or foundation. In other examples, the support members of the reservoir may rest on a floor, in a warehouse for example, consisting of other material than concrete. It is thus to be understood that the base plate being configured to be attached to a support surface includes the base plate being configured to be attached to a concrete base, a mounting platform, floor or any support surface for the reservoir.

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION OF THE DRAWINGS

Figure 1A:
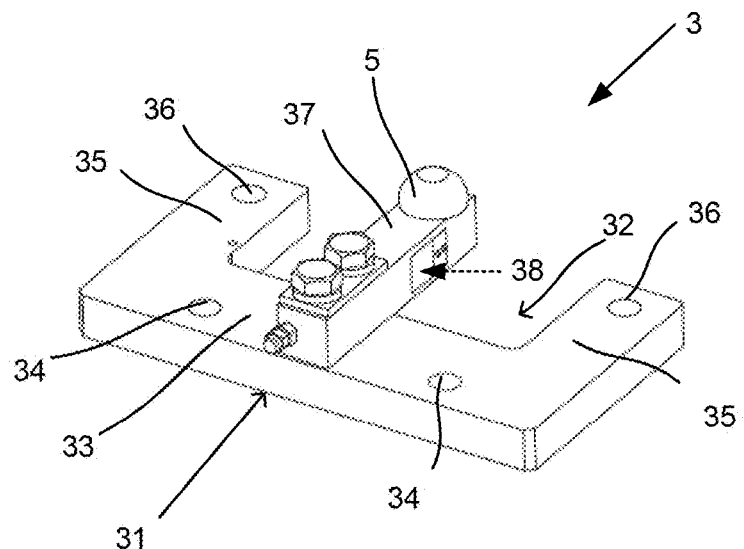
FIG. 1a-b schematically illustrates details of a monitoring arrangement for a reservoir according to examples.
Figure 1B:
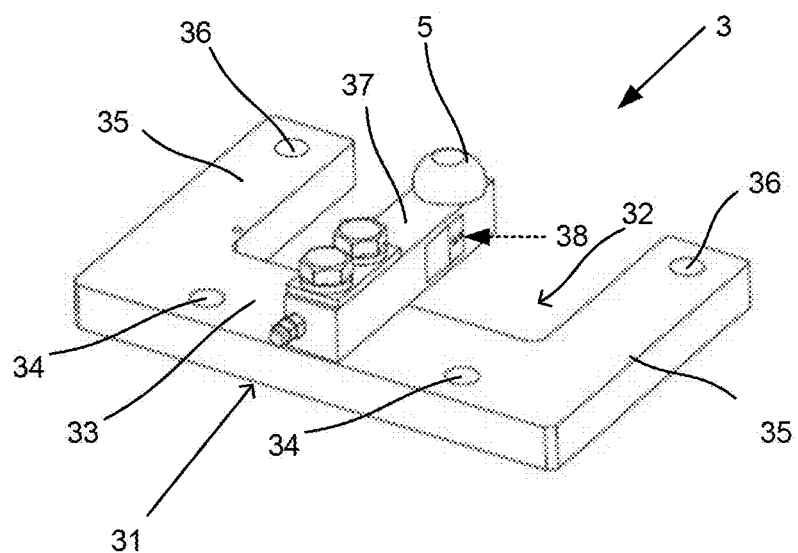

FIGS. 1a and 1b schematically illustrate details of a monitoring arrangement 1 for a reservoir according to examples. The reservoir may be configured as disclosed in FIG. 4. The monitoring arrangement 1 comprises a load cell module 3 shown in FIGS. 1a and 1b. The load cell module 3 comprises a base plate 31 for attachment to a support surface, such as a floor, a concrete base or the ground. The load cell modules 3 shown in FIGS. 1a and 1b are similarly configured but differ in the dimensions of the base plate 31. The load cell module 3 further comprises an elongated measuring device 37 attached to the base plate 31. The monitoring arrangement 1 further comprises an adapter unit 4, shown in FIGS. 2a, 2b and 3, which is configured to be attached to a support member of the reservoir and rest on the measuring device 37. The support member of the reservoir may be of the type shown in FIGS. 2-5 but variations are possible within the scope of the invention. The base plate 31 of the load cell module 3 comprises a recess 32 allowing the base plate 31 to at least partly surround the support member circumferentially, when installed. The measuring device 37 is arranged on the base plate 31, such that it at least partly extends over the recess 32 and thereby enables deformation of the measuring device 37.

The load cell module 3 may be a strain gauge module, for example a bending beam load cell module. The measuring device 37 of the load cell module 3 may thus be referred to as a bending beam load cell. The measuring device 37 may be subject to elastic deformation under the load of the support member, thereby indicating the weight of the reservoir.

The recess 32 of the base plate 31 allows it to at least partly surround a support member of a reservoir in a circumferential direction. When installed, the edges of the recess 32 extend at least partially along the circumference/periphery of the support member. The support member, including any support plate associated therewith, may have a variety of cross-sectional shapes and dimensions, and the recess 32 may thus be shaped to fit the cross-section of the support member. In these examples, the recess 32 has an essentially rectangular shape but the recess 32 may have an essentially circular shape, square shape or similar. The recess 32 may be formed in the base plate 31, such that the base plate 31 is substantially U-shaped.

The base plate 31 may comprise one centre portion 33 and two projections 35 extending essentially perpendicularly from the centre portion 33. The two projections 35 may be arranged at opposite ends of the centre portion 33. The two projections 35 may be configured to extend along a part of a circumference of a support member. The two projections 35 may be adapted in length to fit the intended support member. The projections 35 shown in FIG. 1b extend further from the centre portion 33 than those shown in FIG. 1a, as an example. Although not shown in this figure, the two projections 35 may be arranged with an angle in relation to the centre portion 33 in order to fit the support member properly, wherein the angle is larger than 90 degrees. The two projections 35 may thus diverge in direction away from the centre portion 33.

The centre portion 33 may comprise at least one attachment point 34 for attaching the base plate 31 to the support surface on which the reservoir is arranged. The attachment point 34 may be configured as a through-hole in the base plate 31, adapted to receive a fastener, such as a screw or bolt. The centre portion 33 may comprise a plurality of attachment points 34 and in these examples, the centre portion 33 comprises two attachment points 34. The projections 35 may also comprise at least one attachment point 36 each for attaching the base plate 31 to the support surface. The attachment points 36 on the projections 35 may be configured as through-holes in the base plate 31, adapted to receive a fastener, such as a screw or bolt. Arranging the attachment points 34, 36 of the base plate 31 both in the centre portion 33 and in the projections 35, leads to a steady base plate 31, which is firmly attached to the support surface and prevented from tilting.

The elongated measuring device 37 is arranged on the base plate 31 such that it extends over the recess 32. The recess 32 will this way allow the measuring device 37 to be deformed/bent in a downward direction by the load applied on the measuring device, without touching the base plate 31 or the ground. Typically, the measuring device 37 is attached to the centre portion 33 of the base plate 31. The measuring device 37 may thus extend in parallel with the projections 35 of the base plate 31.

The load cell module 3 of the monitoring arrangement 1 further comprises a sensor device 38 arranged in the measuring device 37 for sensing a deformation of the measuring device 37. The sensor device 38 is operatively connectable to a control unit (71, see FIG. 3). The sensor device 38 may comprise a strain gauge or similar. The sensor device 38 may be configured to convert the detected deformation to electrical signals and transmit them to the control unit 71. The sensor device 38 may comprise, or be electrically connected to, a transmitter, in order to transmit data to the control unit 71.

The monitoring arrangement 1 may further comprise a load support element 5 configured to be arranged between the measuring device 37 and the adapter unit 4. The load support element 5 will be further described with regard to FIG. 2b.

Figure 2A:
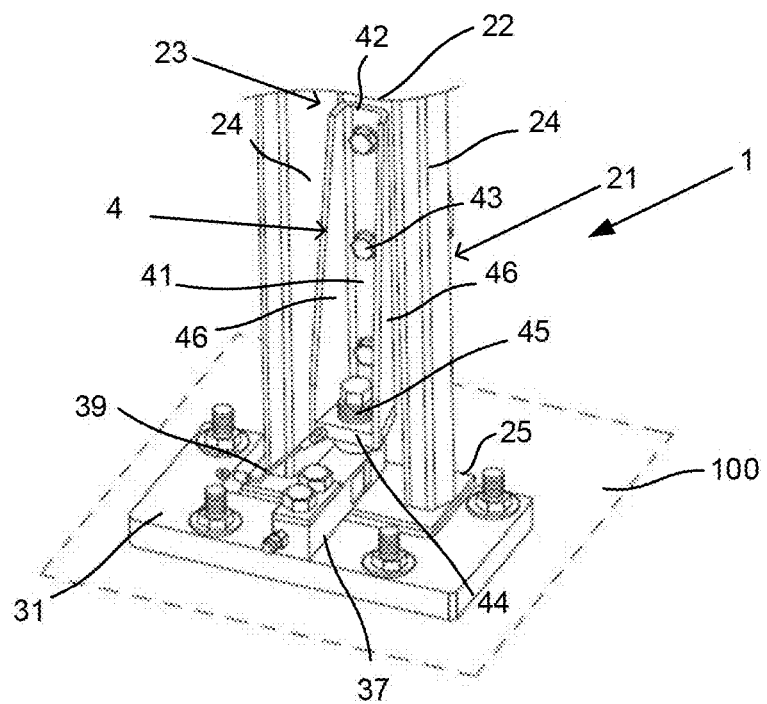
FIG. 2a-b schematically illustrates a front view respectively a cross-sectional view of a monitoring arrangement according to an example.
Figure 2B:
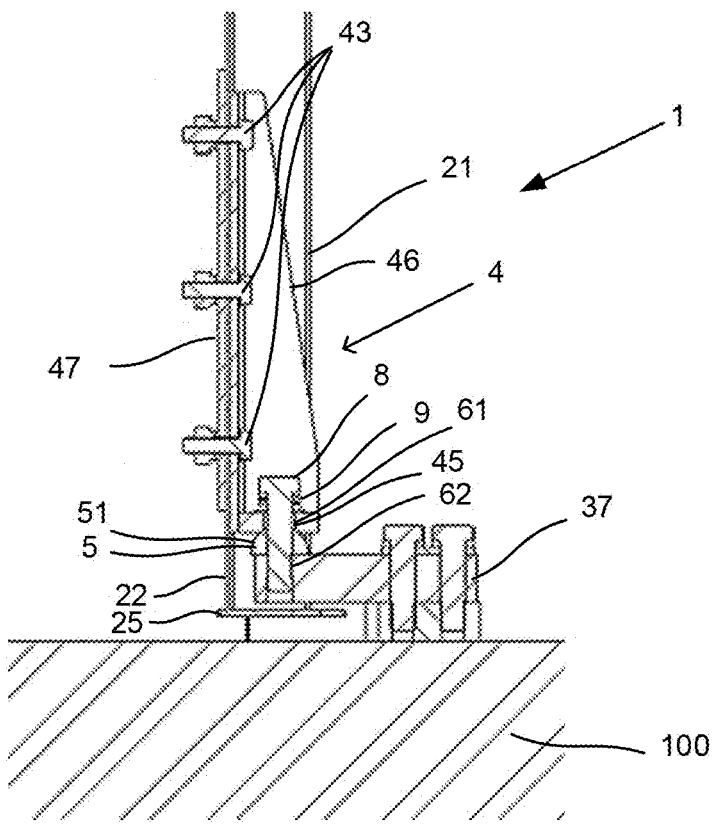

FIGS. 2a-b schematically illustrate a front view and a cross-sectional view, respectively, of a monitoring arrangement 1 according to an example. In these figures, the monitoring arrangement 1 is installed at a support member 21 of a reservoir. FIG. 2a shows the adapter unit 4 of the monitoring arrangement 1 being attached to the support member 21 in a cavity 23 formed by the support member 21 profile shape. The load cell module 3 is thus arranged such that the measuring device 37 extends into the cavity 23. The cavity 23 may also be referred to as a chamber, space, or opening. The support member 21 may comprise a rear wall 22 and two sidewalls 24 extending away from the rear wall 22. The sidewalls 24 may constitute short ends of the support member 21 and the rear wall 22 may constitute a long end of the support member 21, or vice versa. The cavity 23 is formed between the rear wall 22 and the sidewalls 24. The adapter unit 4 of the monitoring arrangement 1 is in this example attached to the rear wall 22 of the support member 21, inside the cavity 23.

The recess 32 of the base plate 31 is here adapted to the shape of a support plate 25 of the support member 21. The load cell module 3 of the monitoring arrangement 1 is arranged with the centre portion 33 of the base plate 31 extending along the opening of the cavity 23 and the two projections 35 of the base plate 31 extending at least partly along the sidewalls 24 of the support member 21.

As shown in FIG. 2a, the adapter unit 4 may comprise a bracket 41. The bracket 41 may be L-shaped and comprise two legs 42, 44 arranged essentially perpendicularly to each other. The two legs may be referred to as a vertical leg 42 and a horizontal leg 44. The vertical leg 42 of the bracket 41 is attached to the rear wall 22 of the support member 21. The horizontal leg 44 extends essentially parallel with the ground or floor surface and is connected to the measuring device 37. The horizontal leg 44 may be shorter than the vertical leg 42. The vertical leg 42 of the bracket 41 comprises at least one attachment point 43, or aperture, for attachment to the support member 21 by means of fasteners. The horizontal leg 44 of the bracket 41 comprises at least one attachment point 45 for attachment to the measuring device 37, by means of a fastener 8. The attachment points 43, 45 may be through-holes.

The bracket 41 may further comprise two parallel sidewalls 46 connected to the vertical leg 42 and the horizontal leg 44. The sidewalls 46 may extend essentially perpendicularly to the vertical leg 42 and the horizontal leg 44. The sidewalls 46 may be essentially triangular shaped, such that the sidewalls 46 taper in direction from the horizontal leg 44 along the length of the vertical leg 42.

The measuring device 37 of the load cell module 3 may be attached to the base plate 31 at one end, and extend into the cavity 23 formed by the support member 21 profile shape at the other end. This way, the measuring device 37 connects to the adapter unit 4 in the cavity 23.

As shown in FIG. 2a, the load cell module 3 may further comprise a ground wire 39, which may also be referred to as a ground cable, grounding cable, earthing wire, earthing cable etc. The ground wire 39 may be arranged to connect the base plate 31 and the adapter unit 4. The ground wire 39 is configured to divert electricity from the reservoir construction to the ground.

As shown in FIG. 2*b*, the adapter unit 4 may be attached to the support member 21 by means of fasteners such as screws or bolts. The fasteners may be inserted into one or more attachment points 43 in the adapter unit 4 and through the rear wall 22 of the support member 21. The monitoring arrangement 1 may further comprise a back plate 47 configured to be arranged on the opposite side of the support member 21 from the adapter unit 4. The fasteners may then extend through the adapter unit 4 and the rear wall 22 of the support member 21 as well as the back plate 47. The back plate 47 may act as reinforcement for the rear wall 22 of the support member 21, thereby strengthening the connection of the adapter unit 4 to the support member 21. The back plate 47 may also provide stability to the construction since the back plate 47 attached to the rear wall 22 adds stiffness to the support member 21.

The monitoring arrangement 1 may further comprise a load support element 5 configured to be arranged between the measuring device 37 of the load cell module 3 and the adapter unit 4, as shown in FIG. 2*b*. The load support element 5 comprises a curved surface 51. By means of the curved surface 51, the load support element 5 is configured to compensate for any angular displacement between the load cell module 3 and the adapter unit 4. The load support element 5 may be essentially semi-spherical or spherical.

In this example, the load support element 5 is arranged on the measuring device 37, and the load cell module 3 is arranged such that the adapter unit 4 abuts the curved surface 51 of the load support element 5. It is, however, to be understood that the load support element 5 may be attached to the adapter unit 4 and the curved surface 51 of the load support element 5 may abut the measuring device 37.

As shown in FIG. 2*b*, the measuring device 37 and the adapter unit 4 of the monitoring arrangement 1 may be connected to each other by means of a fastener 8 extending through the adapter unit 4, the load support element 5 and the measuring device 37. For this reason, the adapter unit 4 may comprise a first through-hole 61 at an attachment point 45 in the horizontal leg 44 of the bracket 41. The first through-hole 61 may have a first diameter. The load support element 5 and the measuring device 37 may comprise a second through-hole 62 with a second diameter, wherein the first diameter is larger than the second diameter. The first through-hole 61 having a larger diameter than the second through-hole 62 allows movement between the adapter unit 4 and the measuring device 37. The connection between the adapter unit 4, the load support element 5 and the measuring device 37 limits lateral movement of those components in relation to each other by the shank of the fastener 8 bearing upon the sides of the through-holes 61, 62. However, the clearance between the fastener 8 and the first through-hole 61 in the adapter unit 4 allows some lateral movement to occur.

The monitoring arrangement 1 may also comprise a spring washer 9 configured to be arranged around the fastener 8 connecting the adapter unit 4 and the measuring device 37. The spring washer 9 may also be referred to as a split lock washer. The spring washer 9 is arranged around the fastener 8 at the adapter unit 4. The spring washer 9 provides vibration resistance while maintaining resistance to rotation of the fastener 8. Furthermore, arranging the spring washer 9 around the fastener 8 may allow for some vertical movement between the adapter unit 4 and the measuring device 37 without compromising the stability of the connection.

Figure 3:
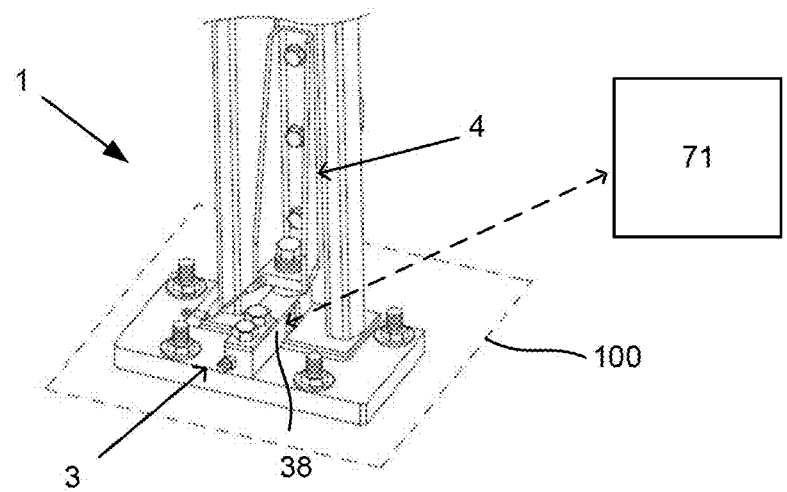
FIG. 3 schematically illustrates a monitoring arrangement for a reservoir according to an example.

FIG. 3 schematically illustrates a monitoring arrangement 1 for a reservoir 2 according to an example. The monitoring arrangement 1 may be configured as disclosed in FIG. 1*a*, 1*b*, 2*a* or 2*b* and further comprises a control unit 71 operably coupled to the load cell module 3.

The control unit 71 may be configured to receive electrical signals corresponding to elastic deformation of the measuring device 37 from the sensor device 38 of the load cell module 3 and determine the current weight of the reservoir based on the electrical signal. The determined weight of the reservoir may be stored in a memory in the control unit 71 or in an external memory. The control unit 71 may also be configured to estimate the volume of content in the reservoir based on the determined weight of the reservoir. The control unit 71 or the monitoring arrangement 1 may comprise a data processing unit. The control unit 71 may be configured to transmit the determined weight or volume of content in the reservoir, to a second control unit, to a node in a communication network, such as the cloud or a server, and/or to a piece of user equipment, such as a computer, smartphone, tablet etc. associated with a user monitoring the reservoir by means of the monitoring arrangement 1.

The control unit 71 may further be configured to perform suitable actions based on the determined weight. The suitable action may comprise controlling the outflow from the reservoir, ordering more feed or similar. According to an example, the control unit 71 may be configured to provide an alert based on the determined weight, such that an operator can perform suitable actions. The alert or warning may be provided audibly and/or visually. The alert or warning may be presented on a display. The alert or warning may be transmitted to a control centre and/or to an operator centre for reservoir.

Figure 4:
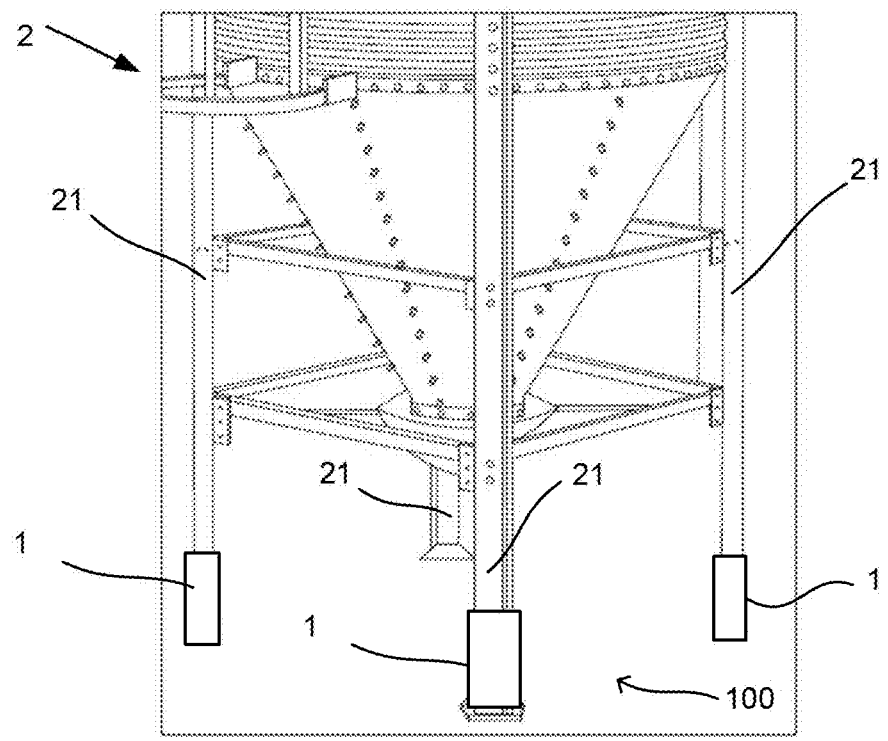
FIG. 4 schematically illustrates a reservoir having a plurality of support members according to an example.

FIG. 4 schematically illustrates a reservoir 2 having a plurality of support members 21 according to an example. Only a part of the reservoir 2 is shown in the figure. The reservoir 2 may be a silo, tank, feed bin or any other type of reservoir 2, which rests on support members 21. The reservoir 2 may be used for storing and distributing particles or liquids, such as grains, sand, pellets or milk, wine, oils etc. The support members 21 may also be referred to as legs. The weight of the reservoir 2 is distributed on the support members 21. The reservoir 2 may have at least two support members 21 depending on the configuration and placement of the reservoir 2. The support members 21 of the reservoir 2 may be configured as disclosed in FIG. 2*a*.

The reservoir 2 comprises a monitoring arrangement 1 as disclosed in FIG. 1*a*, 1*b*, 2*a*, 2*b* or 3. In this example, the monitoring arrangement 1 comprises four load cell modules 3 and four adapter units 4, one at each support member 12 of the reservoir 2. The adapter unit 4 is attached on the respective support member 21 and the load cell module 3 is arranged such that the base plate 31 at least partly surrounds the support member 21 circumferentially and such that the adapter unit 4 rests on the measuring device 37.

Figure 5:
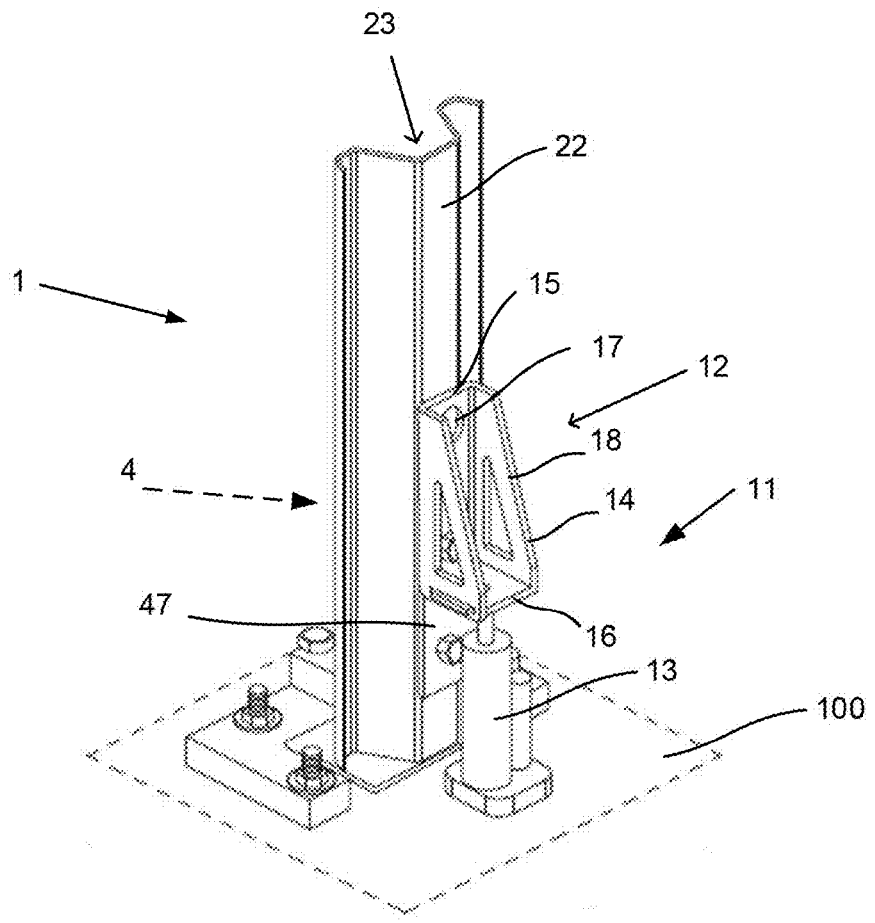
FIG. 5 schematically illustrates details of a monitoring arrangement for a reservoir according to an example.

FIG. 5 schematically illustrates a monitoring arrangement 1 for a reservoir 2 having a plurality of support members 21 according to an example. The monitoring arrangement 1 may be configured as disclosed in FIG. 1*a*, 1*b*, 2*a*, 2*b* or 3, and further comprises a lifting arrangement 11 configured for use during installation at a support member 21 of the reservoir 2.

The lifting arrangement 11 comprises a lifting adapter 12 configured to be attached to the support member 21, and a lifter 13 configured to interact with the lifting adapter 12 to lift the support member 21 above the support surface during installation of a load cell module 3. The lifting adapter 12 may comprise an L-shaped bracket 14 comprising two legs 15, 16 arranged at an essentially 90-degree angle. The two legs 15, 16 may be referred to as a vertical leg 15 and a horizontal leg 16. The vertical leg 15 is attached to the support member 21. Specifically, the vertical leg 15 is attached to the rear wall 22 of the support member 21. The vertical leg 15 may thus comprise a plurality of attachment points 17, or apertures, for attachment to the support member 21 by means of a fastener.

The lifting adapter 12 may be configured to be attached on an opposite side of the support member 21 compared to the adapter unit 4. The lifting adapter 12 may be attached to the support member 12, such that it abuts the back plate 47 of the monitoring arrangement. The lifting adapter 12 may be configured to be attached to the support member 21 using at least one of the fasteners for attaching the adapter unit 4 to the support member 21. Fasteners attaching the adapter unit 4 to the support member 21 may protrude through the support member 21, on the opposite side of the rear wall 22. The lifting adapter 12 may thereby be mounted on a fastener protruding through the rear wall 22 and may be fastened by means of an end nut of the fastener. The lifting adapter 12 may further comprise two parallel sidewalls 18 connected to the vertical leg 15 and the horizontal leg 16. The sidewalls 18 may extend essentially perpendicularly to the vertical leg 15 and the horizontal leg 16. The sidewalls 18 may be essentially triangular shaped, such that the sidewalls 18 taper in direction from the horizontal leg 16 along the length of the vertical leg 15. The sidewalls 18 may each comprise a hollow section.

The lifter 13 may be any suitable lifting device, for example a mechanical, hydraulic or pneumatic jack. The lifter 13 is configured to interact with the lifting adapter 12 to lift the support member 21 above the ground. More specifically, the lifter 13 may be configured to interact with the horizontal leg 16 of the L-shaped bracket 14 of the lifting adapter 12.

The monitoring arrangement 1 may also comprise a template drill plate, which may be used for marking the attachment points of the adapter unit 4 on the support member 21. Such a template drill plate or drill guide (not shown in the figures), which indicates the proper placement of the drill holes may be supplied to the installer as a part of the monitoring arrangement 1, in order to facilitate installation and ensure proper placement of the fasteners. The monitoring arrangement 1 may further comprise any suitable fastener devices, such as screws, bolts and nuts, to be used during installation of the different components of the monitoring arrangement 1.

Figure 6:
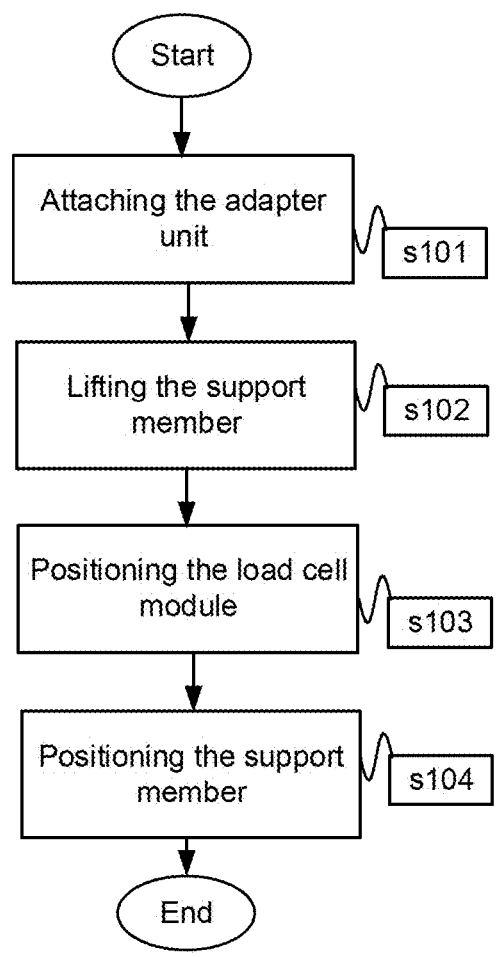
FIG. 6 shows a flowchart of a method for installing a monitoring arrangement according to an example.

FIG. 6 shows a flowchart of a method for installing a monitoring arrangement 1 at a support member 21 of a reservoir 2 according to an example. The monitoring arrangement 1 may be configured as disclosed in FIG. 1a, 1b, 2a, 2b, 3 or 5. The method may be performed by using a lifting arrangement 11 as disclosed in FIG. 5. The method comprises attaching s101 the at least one adapter unit 4 on a support member 21; lifting s102 the support member 21 above the support surface 100; positioning s103 the at least one load cell module 3, such that the base plate 31 at least partly surrounds the support member 21 circumferentially; and positioning s104 the support member 21, such that the at least one adapter unit 4 rests on the measuring device 37 of the load cell module 3. By this method, a monitoring arrangement 1 as disclosed herein can easily be installed at a reservoir 2 without the need for expensive equipment such as lifting cranes etc. The method may be a retrofit method, and the monitoring arrangement 1 may thus be installed at a reservoir 2, which is already in use. Advantageously, a load cell module 3 and an adapter unit 4 is installed at each support member 21 of the reservoir 2 and the method is thus repeated for each support member 21. The load cell modules 3 and adapter units 4 at each support member 21 may be installed sequentially, one after the other, for example in a clockwise direction.

Attaching s101 the adapter unit 4 on a support member 21 may comprise drilling a plurality of holes in the support member 21 and attaching the adapter unit 4 by means of fasteners arranged through the holes. The adapter unit 4 may be attached at the support member 21 at a predetermined height, enabling the adapter unit 4 to rest on the measuring device 37 when the monitoring arrangement 1 is installed. Thus, the adapter unit 4 is attached to the support member 21 at a predetermined height, such that the support member 21 do not touch the support surface 100 when the adapter unit 4 rests on the measuring device 37.

The step of attaching s101 the adapter unit 4 on the support member 21 may comprise using the template drill plate indicating where the holes for attaching the adapter unit 4 should be drilled on the support member 21.

Attaching s101 the adapter unit 4 on a support member 21 may comprise arranging the adapter unit 4 on a first side of the support member 21, and arranging a back plate 47 on the opposite side of the support member 21, and attaching them by means of fasteners extending through the adapter unit 4, the support member 21 and the back plate 47. In one example, attaching s101 the adapter unit 4 on a support member 21 comprises arranging the adapter unit 4 in a cavity 23 formed by the support member 21 profile shape.

The step of lifting s102 the support member 21 may comprise attaching a lifting adapter 12 on the support member 21; and lifting the support member 21 above the ground by means of a lifter 13 interacting with the lifting adapter 12. Lifting s102 the support member 21 may thus comprise arranging the lifter 13 underneath the lifting adapter 12 and operating the lifter 13, such that it abuts the lifting adapter 12 and eventually lifts the support member 21 from the ground. The lifter 13 thus applies a lifting force on the adapter unit 12. By using this lifting arrangement 11, the installation of the monitoring arrangement 1 can be performed by a single person without the need of lifting cranes or other expensive equipment. Attaching a lifting adapter 12 on the support member 21 may comprise attaching the lifting adapter 12 temporarily. Thus, the lifting adapter 12 may be removably attached to the support member 21. This way, the same lifting adapter 12 can be used for installation of a plurality of load cell modules 3 and adapter units 4 on all support members 21 of the reservoir 2.

The step of lifting s102 the support member 21 may comprise attaching the lifting adapter 12 on an opposite side of the support member 21 compared to the adapter unit 4, by using a fastener used for attaching the adapter unit 4. The lifting adapter 12 and the adapter unit 4 are thus attached to the support member 21 by means of at least one common fastener. This way, no separate attachment arrangement for the lifting adapter 12 is required and installation of the monitoring arrangement 1 is facilitated. By attaching the adapter unit 4 and the lifting adapter 12 on opposites sides of the support member 21, using the same fasteners, the number of required through holes in the support member 21 can be reduced. A robust and easily installed lifting arrangement 11 is thereby achieved.

In the event that the method is performed to retrofit a monitoring arrangement 1 at a reservoir 2, the step of lifting s102 the support member 21 may also comprise detaching the support member 21 from the support surface 100 before lifting the support member 21. Thus, if the reservoir 2 is positioned on a platform and the support members 21 are attached to the platform by means of fasteners, each support member 21 should be detached from the platform before trying to lift the support member 21. The support member 21 may be detached from the support surface by unscrewing fasteners or by cutting off the fasteners, such that the support member 21 is no longer attached.

The step of positioning s103 the load cell module 3, such that the base plate 31 at least partly surrounds the support member 21 circumferentially may comprise positioning the load cell module 3, such that at least a part of the measuring device 37 is arranged underneath and is aligned with the adapter unit 4 on the support member 21.

The step of positioning s104 the support member, such that the adapter unit 4 rests on the measuring device 37 of the load cell module 3 may comprise lowering the support member 21 by means of the lifter 13. When the support member 21 has been positioned, such that it rests on the measuring device 37, the lifter 13 can be removed from underneath the lifting adapter 12 and the lifting adapter 12 can be removed/detached from the support member 21. The lifter 13 and the lifting adapter 12 can then be used on another support member 21 to install another load cell module 3.

The step of positioning s103 the load cell module 3 may comprise positioning the load cell module 3, such that the measuring device 37 extends into a cavity 23 formed by the support member 21 profile shape. With the adapter unit 4 attached to the support member 21 in the cavity 23 of the support member 21, the load cell module 3 should be positioned such that the measuring device 37 extends into the cavity 23 so that the adapter unit 4 can rest on the measuring device 37. Furthermore, in the event that the monitoring arrangement 1 comprises a load support element 5, the load cell module 3 with the load support element 5 should be positioned, such that the load support element 5 is arranged underneath, and is aligned with, the adapter unit 4 on the support member 21. The step of positioning s104 the support member 21 such that the adapter unit 4 rests on the measuring device 37 of the load cell module 3 may then comprise positioning the support member 21, such that it abuts the load support element 5. The step of positioning s103 the load cell module 3 may comprise positioning the load cell module 3, such that the load support element 5 is arranged between the adapter unit 4 and the measuring device 37.

Figure 7:
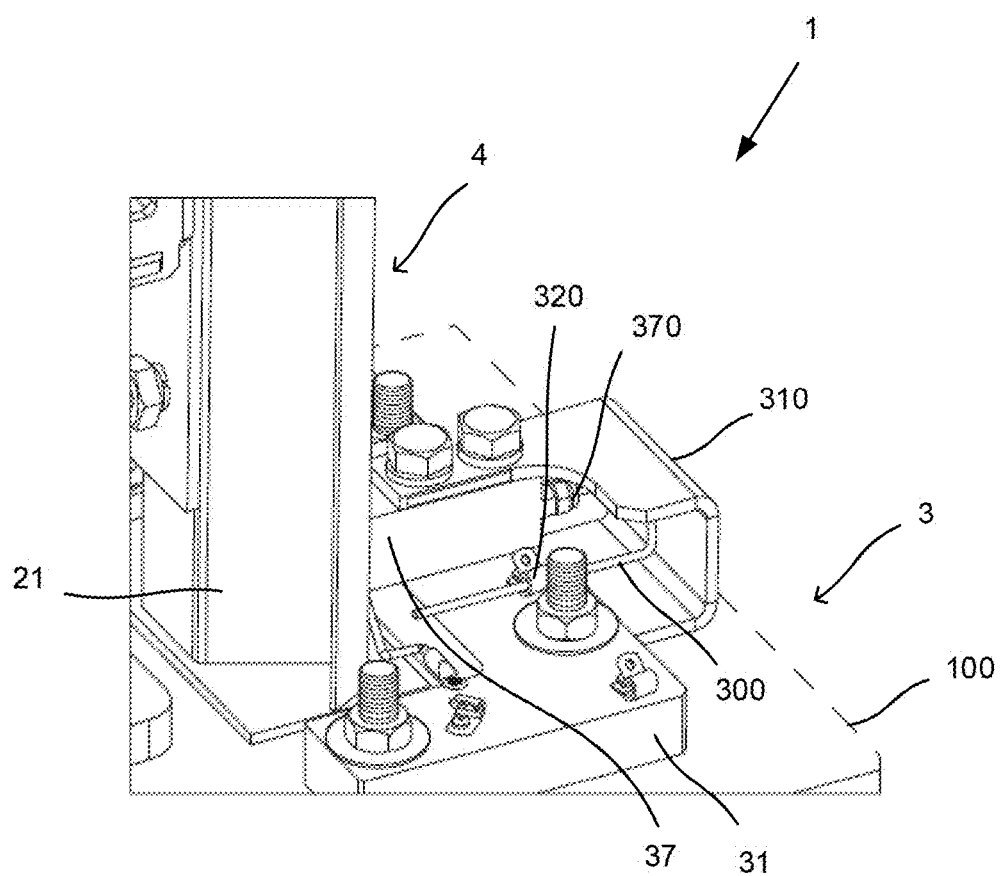
FIG. 7 schematically illustrates a monitoring arrangement for a reservoir according to an example.

FIG. 7 schematically illustrates a monitoring arrangement 1 for a reservoir 2 according to an example. The monitoring arrangement 1 may be configured as disclosed in FIG. 1a, 1b, 2a, 2b, 3 or 5. The monitoring arrangement 1 thus comprises a load cell module 3 with a base plate 31 and an elongated measuring device 37 attached to the base plate 31. The load cell module 3 of the monitoring arrangement 1 further comprises a sensor device 38 arranged in the measuring device 37 for sensing a deformation of the measuring device 37. The monitoring arrangement 1 further comprises at least one adapter unit 4 configured to be attached to a support member 21 of the reservoir 2 and rest on the measuring device 37.

Figure 8:
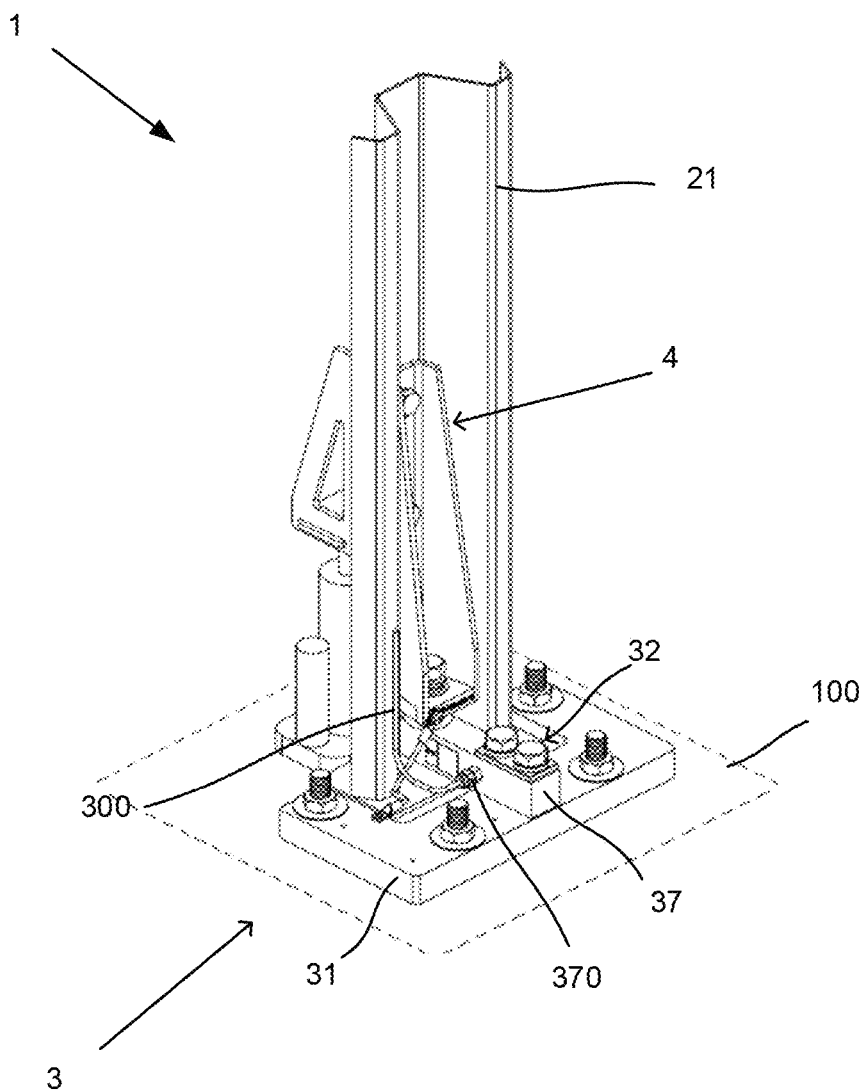
FIG. 8 schematically illustrates a monitoring arrangement for a reservoir according to an example.

FIGS. 7 and 8 show the monitoring arrangement 1 comprising a cable 300 for operably coupling the measuring device 37 with a control device 71, such as disclosed in FIG. 3. The cable 300 may be arranged to connect the measuring device 37 with a junction box (not shown), which junction box, in turn, is operably coupled to the control device 71. Thus, the sensor device 38 of the measuring device 37 may be operably coupled to the control device 71 via a junction box arranged at the reservoir 2. It is to be understood that the monitoring arrangement 1 as illustrated in the previous figures typically comprises this cable 300 as well, even though it is not shown in the figures.

The cable 300 protrudes from the measuring device 37 at a connection point 370. The connection point 370 is here arranged at a short end of the measuring device 37 and thus faces away from the support member 21 and the adapter unit 4. A part of the cable 300 will thereby protrude away from (beyond) the base plate 31 before the cable 300 is bent in direction towards, and over, the base plate 31. With this arrangement of the cable 300, there might be a risk that the cable 300 gets damaged and the transfer of data from the measuring device 37 to the control device 71 may thereby be destroyed.

The monitoring arrangement 1 therefore comprises a cable protection 310. The cable protection 310 may comprise a bent metal plate and may be connected to the measuring device 37 to be held in place. The cable protection 310 may be connected to the measuring device 37 using the same fasteners as connecting the measuring device 37 to the base plate 31. The cable protection 310 may thus have a C-shape or U-shape where one leg is connected to the measuring device 37 and the other rests on the support surface 100 adjacent the base plate 31. The cable protection 310 is thus configured to surround at least the protruding part of the cable 300 and protect it from being physically affected/damaged. The cable 300 may further be connected to the base plate 31 by means of cable holder(s) 320. It is to be noted that even though the cable 300 is illustrated as ending in line with the recess 32 of the base plate 31, the cable 300 is in reality longer and is typically connected to a junction box.

FIG. 8 schematically illustrates a monitoring arrangement 1 for a reservoir 2 according to an example. The monitoring arrangement 1 may be configured as disclosed in FIG. 1a, 1b, 2a, 2b, 3 or 5. In this example, the monitoring arrangement 1 comprises a cable 300 for operably coupling the measuring device 37 with a control device 71, such as disclosed in FIG. 3. The cable 300 may be arranged to connect the measuring device 37 with a junction box (not shown), which junction box, in turn, is operably coupled to the control device 71. Thus, the sensor device 38 of the measuring device 37 may be operably coupled to the control device 71 via a junction box arranged at the reservoir 2. The cable 300 protrudes from the measuring device 37 at a connection point 370. The connection point 370 is here arranged at a long side of the elongated measuring device 37. The cable 300 will thereby protrude away from the long side of the measuring device 37, suitably over the base plate 31 or the recess 32 of the base plate 31, and then be bent upwards along the support member 21 of the reservoir 2. By this configuration of the measuring device 37 where the cable 300 protrudes from the measuring device 37 closer to the support member 21, the cable 300 will not protrude beyond the base plate 31 and it will be less likely to be damaged. A safe and reliable connection between the measuring device 37 and the control device 71 is thereby achieved.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various examples and with the various modifications appropriate to the intended use.

The invention claimed is:

1. A monitoring arrangement for a reservoir with a plurality of support members, the monitoring arrangement comprising:
   at least one load cell module with a base plate for attachment to a support surface and an elongated measuring device attached to the base plate; and
   at least one adapter unit configured to be attached to a support member of the reservoir and rest on the measuring device,
   wherein the base plate of the at least one load cell module comprises a recess allowing the base plate to at least partly surround the support member circumferentially when installed, and the measuring device is arranged on the base plate, such that the measuring device at least partly extends over the recess.

2. The monitoring arrangement according to claim 1, wherein the at least one adapter unit is configured to be attached in a cavity of the support member, and the at least one load cell module is configured to be arranged, such that the measuring device extends into the cavity.

3. The monitoring arrangement according to claim 1, further comprising at least one load support element configured to be arranged between the measuring device of the at least one load cell module and the at least one adapter unit, wherein the at least one load support element comprises a curved surface.

4. The monitoring arrangement according to claim 3, wherein the at least one load support element is arranged on the measuring device and the at least one load cell module is configured to be arranged, such that the at least one adapter unit abuts the curved surface of the load support element when installed.

5. The monitoring arrangement according to claim 1, wherein the at least one load cell module comprises a sensor device arranged in the measuring device for sensing a deformation of the measuring device, the sensor device being operatively connectable to a control unit.

6. The monitoring arrangement according to claim 1, wherein the measuring device and the at least one adapter unit are configured to be connected to each other by means of a fastener extending through the at least one adapter unit and the measuring device.

7. The monitoring arrangement according to claim 6, wherein, for connection by means of the fastener, the at least one adapter unit comprises a first through hole with a first diameter, and the measuring device comprises a second through hole with a second diameter, wherein the first diameter is larger than the second diameter.

8. The monitoring arrangement according to claim 6, further comprising at least one spring washer configured to be arranged around the fastener at the at least one adapter unit.

9. The monitoring arrangement according to claim 1, further comprising a control unit operably coupled to the at least one load cell module.

10. The monitoring arrangement according to claim 1, further comprising a lifting arrangement configured for use during installation at a support member of the reservoir, wherein the lifting arrangement comprises a lifting adapter configured to be attached to the support member, and a lifter configured to interact with the lifting adapter to lift the support member above the support surface.

11. A reservoir with a plurality of support members, wherein the reservoir comprises a monitoring arrangement according to claim 1, wherein the at least one adapter unit of the monitoring arrangement is attached on a support member of the reservoir and the at least one load cell module is arranged, such that the base plate at least partly surrounds the support member circumferentially and such that the at least one adapter unit rests on the measuring device.

12. A method for installing a monitoring arrangement according to claim 1 at a reservoir with a plurality of support members, the method comprising:
   attaching the at least one adapter unit on a support member;
   lifting the support member above the support surface;
   positioning the at least one load cell module, such that the base plate at least partly surrounds the support member circumferentially; and
   positioning the support member, such that the at least one adapter unit rests on the measuring device of the load cell module.

13. The method according to claim 12, wherein the step of lifting the support member comprises attaching a lifting adapter on the support member and lifting the support member above the support surface by means of a lifter interacting with the lifting adapter.

14. The method according to claim 12, wherein the step of positioning the at least one load cell module comprises positioning the at least one load cell module such that the measuring device extends into a cavity formed by the support member profile shape.

15. The method according to claim 13, wherein attaching the lifting adapter comprises attaching the lifting adapter on an opposite side of the support member compared to the adapter unit, by using a fastener for attaching the adapter unit.

* * * * *